United States Patent

Numrich et al.

Patent Number: 6,085,441
Date of Patent: Jul. 11, 2000

[54] PROCESS FOR DRYING SEWAGE SLUDGE OR SLUDGES OF SIMILAR CONSISTENCY

[75] Inventors: Reiner Numrich, Borchen; Roland Lücke, Paderborn, both of Germany

[73] Assignee: Gebrueder Loedige Maschinenbau-Gesellschaft mbH, Paderborn, Germany

[21] Appl. No.: 09/101,418

[22] PCT Filed: Jan. 16, 1997

[86] PCT No.: PCT/DE97/00061

§ 371 Date: Jul. 9, 1998

§ 102(e) Date: Jul. 9, 1998

[87] PCT Pub. No.: WO97/27147

PCT Pub. Date: Jul. 31, 1997

[30] Foreign Application Priority Data

Jan. 23, 1996 [DE] Germany ............ 196 02 290

[51] Int. Cl.[7] ........................... F26B 3/08
[52] U.S. Cl. ........................ 34/371; 34/379
[58] Field of Search ............ 34/499, 501, 503, 34/507, 514, 135, 136, 140, 141, 142, 305, 371, 379; 110/216, 219, 221, 224, 226, 229; 210/750, 767, 768, 770, 771; 55/338, 338.1, 467, 467.1, 482.1

[56] References Cited

U.S. PATENT DOCUMENTS

| | | | |
|---|---|---|---|
| Re. 35,251 | 5/1996 | Van Den Broek | 110/221 |
| 4,223,452 | 9/1980 | Chambers | 34/28 |
| 4,687,546 | 8/1987 | Willis | 159/2.1 |
| 5,103,578 | 4/1992 | Rickard | 34/92 |
| 5,137,545 | 8/1992 | Walker | 55/1 |
| 5,149,444 | 9/1992 | Hoch | 210/751 |
| 5,215,670 | 6/1993 | Girovich | 210/770 |
| 5,318,184 | 6/1994 | Krebs | 209/21 |
| 5,373,648 | 12/1994 | Wolf | 34/578 |
| 5,405,579 | 4/1995 | Melzer et al. | 422/26 |
| 5,490,907 | 2/1996 | Weinwurm et al. | 203/29 |
| 5,538,623 | 7/1996 | Johnson et al. | 208/120 |
| 5,915,815 | 6/1999 | Moore et al. | 34/305 |
| 5,960,559 | 10/1999 | Brunnmair et al. | 34/514 |

FOREIGN PATENT DOCUMENTS

| | | |
|---|---|---|
| 0365851 | 5/1990 | European Pat. Off. . |
| 3943366 | 10/1990 | Germany . |

OTHER PUBLICATIONS

"Thermische Kläschlammbehandlug" (Thermal Sewage Sludge Treatment) published by the company of PLEQ Plant & Equipment Engineering GmbH, 1955.

WO 95/14640, Int'l Application published under the PCT, World Intellectual Property Org. Jun. 1995.

*Primary Examiner*—Pamela A. Wilson
*Attorney, Agent, or Firm*—Paul Vincent

[57] ABSTRACT

In a process for drying sewage sludge or sludges of similar consistency, use is made of a device (13) in which vapors arising during contact drying are introduced to at least one compression stage. This stage compresses the vapors to a higher pressure and impurities are separated therefrom. The cleaned and compressed vapors are introduced into the device (13) for contact drying as a heating medium. In this manner, the energy consumed inside the operated installation is used more efficiently to dry the sewage sludge and a considerably improved energy balance is thereby achieved.

6 Claims, 1 Drawing Sheet

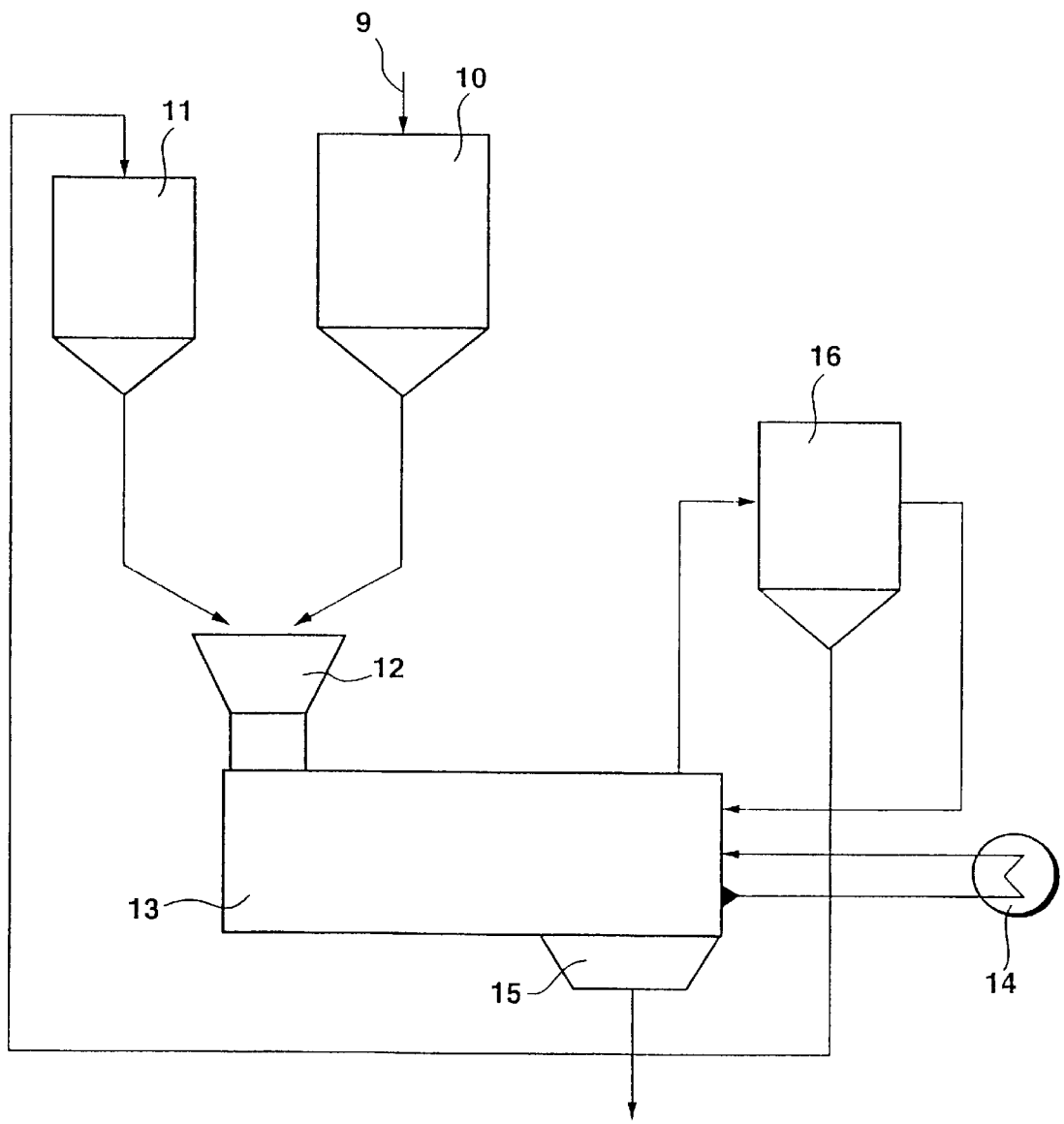

PROCESS FOR DRYING SEWAGE SLUDGE OR SLUDGES OF SIMILAR CONSISTENCY

BACKGROUND OF THE INVENTION

The invention concerns a process for drying sewage sludges or sludges of similar consistency with which impurities are separated from vapors occurring during drying.

A method of this kind has become known in the art through DE 39 43 366 A1.

Environmental protection has been a central theme in public discussions in the industrialized nations during the last two decades. As a result thereof, a plurality of legal requirements have been created e.g. in the European Economic Community. Corresponding action has been taken by the state and community authorities and by the industrial sector as a result of which an improved sewage treatment, i.e. sewage processing or purification, has been achieved.

Beginning with the 1976 guidelines of the EEC concerning pollution due to drainage of certain dangerous materials into the waters of the EEC and up to the EEC Guide Lines of May 1991 concerning the treatment of community sewage and improvements in the general treatment of sewage, there has been a yearly increase in the overall amount of effort expended and the associated funding in order to effect improved purification of sewage from industrial installations and private households. As a logical consequence of sewage purification, recent years have seen an increase in the associated amount of sewage sludge. This will increase even further in the coming years. One has therefore searched for a solution to the problem of how this sewage sludge, an unavoidable waste product of sewage treatment, can be further processed, utilized or disposed of. Sludges having similar consistency occur in industrial installations e.g. in painting installations, washing installations of all kinds and the like.

Since the disposal of sewage sludge is becoming increasingly difficult and expensive due to the shortage of available dumping facilities, a mass and volume reduction in the amount of generated sewage sludge is necessary prior to disposal or further processing. The dumping of sewage sludge will be forbidden by law beginning in the year 2005. A reduction of volume simplifies transportation problems as well as the handling of the sewage sludge. This concerns both the directed treatment e.g. purification, further processing and, if appropriate, even the recycling of the sewage sludge.

Various methods are utilized either separately or collectively to reduce the mass and volume of the sewage sludge involving, for example, influencing evaporation of the moisture bound within the solid sludge components (drying), the decomposition of organic materials through removal of gases as well as the oxidation of organic substances through incineration.

DE 39 43 366 A1 proposes processing steps relating to the temperature of a fluidized bed, to the introduction of solids into the fluidized bed which have large amounts of material which can evaporate, to the removal of dried solids from the fluidized bed, as well as to the gaseous components of the evaporating material removed along with the vapor and other gaseous impurities.

An energy balancing of these processes of treatment and utilization of the sewage sludge takes into consideration the fact that energy must be expended in order to carry out the mechanical liquid removal processes and the thermal drying including processing of the vapours. In contrast thereto, energy is freed when the dried sewage sludge is subsequently incinerated in a power plant. If the sewage sludge is dried, and subsequently incinerated without prior decomposition thereof, the energy balance is compromised. However, if a decomposition process is carried out, a longer processing time disadvantageously results, since the decomposition processes require a certain amount of time. A self-sufficient operation with regard to energy is not possible, since it is always necessary to use more energy than is freed. In order to influence the energy balance during subsequent treatment in a positive, environmental manner, measures for improvement of the drying process are required.

It is therefore the purpose of the present invention to optimize the conventional thermal drying process in such a fashion that the energy utilized during operation of the installation is more efficiently applied for drying the sewage sludge to achieve as positive an energy balance as possible subsequent to incineration of the dried sewage sludge.

This purpose is achieved in accordance with the invention with a method for drying sewage sludge or sludges of similar consistency in which sewage sludge or sludges of similar consistency are processed in a contact drying device from which the vapors occurring during contact drying are introduced to at least one compressor in which the vapors are brought to a higher pressure and impurities are separated out of the vapors, and the purified and increased pressure vapors are utilized as a heating medium in the contact drying device.

A contact drying device is used for effective heating of the sewage sludge.

SUMMARY OF THE INVENTION

Up to this point in time e.g. a bag filter was required for separation of liquid and solid vapor components and a condensating device was needed to condense the vapors. The resulting cooling water had to be removed and the residual vapors introduced to an additional preparation system e.g. a filter for deodorization. Energy was required for each individual step.

One can advantageously avoid the above mentioned bag filters utilized for drying of the sewage sludge up to this point in time or replace them with one single device having a condensating step i.e. with a compressor in which the vapors can be compressed. A plurality of compression stages could also be used within the device.

Vapors are brought to an increased pressure of preferentially 1 to 3 bar and thereby to a higher condensation temperature in the compressor when the required compression pressure is sufficiently high that the boiling point increase is surpassed and a sufficiently large temperature gradient is available for heat transfer. The important operation parameters for choice of a suitable compressor are the pressure increase and the volume flow of the vapor to be compressed. When these conditions are given, vapors can be separated into solid components, substantially organic solids, and vapors, primarily water vapor. The solid organic components can be separately removed. The hot additionally compressed water vapor is, in contrast thereto, no longer fed to the condensating device and cooled rather introduced directly as a heating medium to the device for contact drying. The vapors could be solvent-containing vapors and the separation of the vapor into solid components and gases can take place directly in the compressor.

The furnace which has been used up to this point in time to produce the heating medium can therefore advantageously be more compact or only be utilized to initiate the drying process.

The energy needed to operate the condensing device as well as energy required for operation of the furnace for the drying device can, in any event, be reduced. In addition thereto, the conventionally unused energy in the purified vapors can be fed into the drying circuit. For this reason, the energy balance for operation of the overall installation is improved. Depending on the operation conditions which depend, in turn, on the differences between sewage sludges, the operated installation can ideally have a "positive" energy balance if one also takes the incineration of the dried briquette sewage sludge into consideration.

In a particularly preferred embodiment, a pipe contact drier is utilized as the device for contact drying. Individual pipes are disposed within a housing of the device for contact drying which are parallel and directed preferentially in the axial direction of the device. The surfaces of these pipes are heated by a heating medium flowing within the pipes to produce a proper and effective drying of the damp sewage sludge and to simultaneously effect granulation of the dried product.

In an improvement, the device for contact drying comprises an upstream mixing device in which a dried sewage sludge consistency is produced. The mixing device facilitates mixing of a dried fine-grained granulate with the e.g. mechanically pre-dried sewage sludge to form a pourable mixed product. Recycled dried sewage sludge and/or solid components can be utilized as an additive granulate in the form produced by the vapor cleaning processes in the compressor utilized in accordance with the invention. The addition of these products gives the sewage sludge which is to be dried a peat-like, non-sticky structure to enhance and simplify the drying process.

The method of drying in accordance with the invention effects a drying of all sewage products occurring in community sewage processing installations and also those occurring in industrial installations which is simpler than the conventional one. The process in accordance with the invention can be utilized both in continuous as well as discontinuously operating installations of various size.

Further advantages can be extracted from the description and the accompanying drawing. The previous features mentioned and those to be further described below can be utilized in accordance with the invention individually or collectively in arbitrary combination. The embodiments mentioned are not to be considered exhaustive enumeration, rather have exemplary character.

The invention is illustrated in the drawing and is more closely explained with reference to an embodiment.

BRIEF DESCRIPTION OF THE DRAWING

The FIGURE shows a flow diagram of the method in accordance with the invention.

DESCRIPTION OF THE PREFERRED EMBODIMENT

The method in accordance with the invention is partly shown in the figure in a highly schematic fashion.

A flow diagram is shown which represents the development of the method in accordance with the invention in a simplified fashion. Control and valve devices are not shown, since same are known to one of average skill in the art and are thereby utilized conventionally in an appropriate fashion.

A damp sewage sludge or a sludge of similar consistency is introduced in the direction of arrow 9 into a first collection device (silo) 10. The sewage sludge can be introduced into a mixing device 12 together with a dry granulate located in a second collection device 11, wherein the mixing device 12 is preferentially a horizontal solid mixer (a plough-share mixer). The peat-like mixing product then passes from the mixing device 12 into a contact drying device 13 for thermal drying of the sewage sludge. The contact drying device 13 is preferentially a contact dryer having a plurality of internally disposed parallel pipes or surfaces providing large heat transfer. The peat-like mixing product can be warmed through contact with the outer surfaces of the pipes so that a dried final product and vapors result. For drying, a heating medium is initially heated inside a furnace 14 and can circulate within the contact drying device 13. The dried final product can be removed from the contact drying device 13 via an opening 15 and be further processed or used as fertilizer or fuel.

The vapors are passed into a compressor 16 in which they are brought to a higher pressure and therefore to a higher condensating temperature. In addition, the compression of the vapors causes a deposition of the dust components contained therein. The compressed vapor is saturated, since the resulting over-heating can be reduced through additional evaporation. The newly collected and deposited solid product can be integrated into the processing cycle via the second collection device 11. It can also be removed from the compressor 16 and utilized for other purposes or disposed of.

The purified hot water vapor passes out of the compressor 16 and into the pipes of the contact drying device 13 to utilize the energy in the hot water vapor. This leads, in the stationary state, to reduced operation of the furnace 14 so that, in the method for drying of sewage sludge in accordance with the invention, it may e.g. only be required to start the processing cycle and to compensate for energy losses during operation of the installation. The furnace 14 is then only switched-in during subsequent processing when the amount of heat in the steam produced in the compressor 16 is insufficient. The furnace 14 thereby only initializes and supports drying the sewage sludge. The utilization of hot purified and compressed vapors allows for a savings of 85–90% of the energy previously required for heating in conventional contact drying processes.

In a method for the drying of sewage sludge or sludges having similar consistency, a device (13) is utilized with which the vapors occurring during contact drying are introduced to at least one compression stage. In this compression stage, the vapors are brought to a higher pressure and impurities are separated out of the vapors. The purified and pressurized vapor is introduced as a heating medium to the contact drying device (13) for contact drying. The amount of energy utilized for operation of the installation is thereby more efficiently applied to dry the sewage sludge. A substantially improved energy balance is therefore achieved.

What is claimed is:

1. A method for drying sewage sludge or sludges of a similar consistency, the method comprising the steps of:

a) drying the sludge in a contact drying device;

b) processing exhaust vapors generated during step a) in a compressor to produce heated gases and to separate out solids; and c) heating said contact drying device with said gases heated in step b).

2. The method of claim 1, wherein said contact drying device is a pipe contact dryer.

3. The method of claim 2, further comprising processing the sludge in a mixing device prior to step a) to change a consistency of the sludge.

4. The method of claim 1, further comprising processing the sludge in a mixing device prior to step a) to change a consistency of the sludge.

5. A method for drying sewage sludge or sludges of a similar consistency, the method comprising the steps of:
   a) drying the sludge in a contact drying device;
   b) directly feeding, without intervening filtering, exhaust vapors generated in step a) to a compressor;
   c) processing said exhaust vapors in said compressor to produce heated gases and to separate out solids; and
   d) heating said contact drying device with said gases heated in step c).

6. A method for drying sewage sludge or sludges of a similar consistency comprising the steps of;
   a) drying the sludge in a contact drying device;
   b) directly feeding, without intervening filtering, substantially all exhaust vapors generated in step a) to a compressor;
   c) processing said exhaust vapors in said compressor to produce heated gases and to separate out solids;
   d) heating said contact drying device with said gases heated in step c); and
   e) removing said separated solids from said compressor.

* * * * *